United States Patent [19]
Kang

[11] Patent Number: 5,850,560
[45] Date of Patent: Dec. 15, 1998

[54] AUDIO CONTROL CIRCUIT FOR A COMPUTER SYSTEM SYSTEM HAVING AN ENERGY-SAVING FEATURE

[75] Inventor: Chang-lung Kang, Taipei, Taiwan

[73] Assignee: Chuntex Electronic Co., Ltd., Taipei Hsien, Taiwan

[21] Appl. No.: 700,109

[22] Filed: Aug. 20, 1996

[30] Foreign Application Priority Data

Apr. 18, 1996 [TW] Taiwan ................................. 85205600

[51] Int. Cl.$^6$ ..................................................... G06F 1/32
[52] U.S. Cl. ..................................................... 395/750.06
[58] Field of Search ........................ 395/750.03, 750.05, 395/750.06

[56] References Cited

U.S. PATENT DOCUMENTS 5,167,024 11/1992 Smith et al. ........................ 395/750.04
5,483,464 1/1996 Song .................................. 395/750.05

*Primary Examiner*—Glenn A. Auve
*Attorney, Agent, or Firm*—Bacon & Thomas, PLLC

[57] ABSTRACT

To allow sounds to be output by the audio amplifier of a multi-media computer system during periods of CPU inactivity and display screen blanking, a switch is added to the control circuit of the audio amplifier which overrides the energy-saving shut-down program which would normally be activated to cut-off power to both the monitor display screen and the audio amplifier. The switch is in the form of a transistor whose control electrode is connected to both the power supply and to the CPU, such that the transistor can be turned on either by a signal from the main power circuit or by a keyboard activated signal from the CPU's microprocessor, the collector of the transistor being connected to the audio input terminal of the audio amplifier.

2 Claims, 6 Drawing Sheets

AUDIO CONTROL CIRCUIT FOR A COMPUTER SYSTEM SYSTEM HAVING AN ENERGY-SAVING FEATURE

BACKGROUND OF THE INVENTION

1. Field of the Invention

This invention relates to an audio control circuit for a computer system of the type having an audio amplifier, and in particular to a circuit which can control the audio output of the computer system so that sound can be listened to through the audio amplifier even when the computer system is in an energy-saving state and the video display of the monitor is cut-off.

2. Discussion of Related Art

Computers play an increasingly significant role in everyday life, at home and particularly at work. Computers are of course convenient because of their capability of processing large amounts of data using relatively complex operations in a very short time. It is of course conventional to display information and results of an operation performed by the computer as an image on a video monitor.

Recently, however, the role of computers in everyday life has expanded to include recording and playback of sounds as well as images, greatly expanding potential uses for the computer, including replacement of stand-alone audio components. A computer normally requires a central processing unit (CPU), a peripheral storage device such as a disk drive, and a monitor for displaying information, but for so-called "multi-media" systems, which include both image and sound reproduction capabilities, an audio amplifier is also required.

Because of their mass storage capabilities, compact disc read only memories (CD-ROMS) are generally associated with such systems, although the term "multi-media" is intended to be inclusive of all computer systems with both image and sound capabilities. When a CD-ROM drive in used with the computer system's audio amplifier, music can be transferred directly from the CD-ROM player in the manner of a stand-alone CD player, by-passing the central processing unit.

To save power, an energy-saving device is often included which causes the CPU to issue an instruction to switch the monitor and other non-essential systems into an energy-saving state so as to avoid wasting energy when the system is inactive. While this is a highly desirable feature, it causes a problem when sounds are being played back through the audio amplifier in a way that allows the CPU to remain inactive for extended periods of time, such as when music CDs are being played back via the computer system's CD-ROM player. The problem is that because the energy-saving state is usually initiated based on a lack of CPU activity, shut-down will occur in this situation even though sound is being reproduced through the audio amplifier, thereby interfering with the user's enjoyment of the music.

While one could deactivate the energy saving function, it would be more desirable to maintain the energy saving function as it applies to the screen, and to instead include an arrangement for maintaining the audio output even when the energy-saving function is in effect and the power supply to the monitor screen has been cut-off.

SUMMARY OF THE INVENTION

It is accordingly an objective of the invention to provide an audio control circuit for a multi-media computer system which prevents the audio amplifier from being turned off when the computer is in an energy-saving state, without affecting application of the energy-saving feature to the visual display of the monitor, thereby permitting energy savings to be obtained without interfering with audio reproduction.

This objective is accomplished by adding to the conventional audio amplifier control circuit a direct input from the microprocessor, including a switch connected to the audio amplifier in such a manner that the state of the switch determines whether the amplifier is on or off, and in such a manner that the switch in normally controlled to turn the amplifier off during the energy-saving state. By adding to the on/off switch of the audio amplifier a direct input from the microprocessor, the switch can be made to permit operation of the amplifier even when the switch would ordinarily cause the amplifier to turn off.

In an especially preferred embodiment of the invention, the switch is a transistor whose control electrode is connected to both the power supply and to the microprocessor, such that the transistor can be turned on either by a signal from the main power circuit or by the direct signal from the microprocessor, the collector of the transistor being connected to an on/off input of the audio amplifier.

More particularly, in the illustrated embodiment, the base of the transistor is connected via a diode to the audio "mute" terminal of the microprocessor, which is normally set at a low voltage to permit operation of the audio amplifier but which switches to a high voltage to shut down the audio amplifier. A button or other input device controls the audio signal output terminal of the microprocessor so that when the CPU switches the monitor to the energy saving state and attempts to switch the transistor to a high state, the normal function of the audio amplifier can be maintained depending on the state of the button by overriding the energy-saving circuit to keep the transistor in a low state, thereby allowing the audio amplifier to be independently supplied with power from the monitor power circuit and sound to be heard even when the visual display is not being used and the CPU is inactive for a long period of time.

DETAILED DESCRIPTION OF THE PREFERRED EMBODIMENTS

Figure 1:
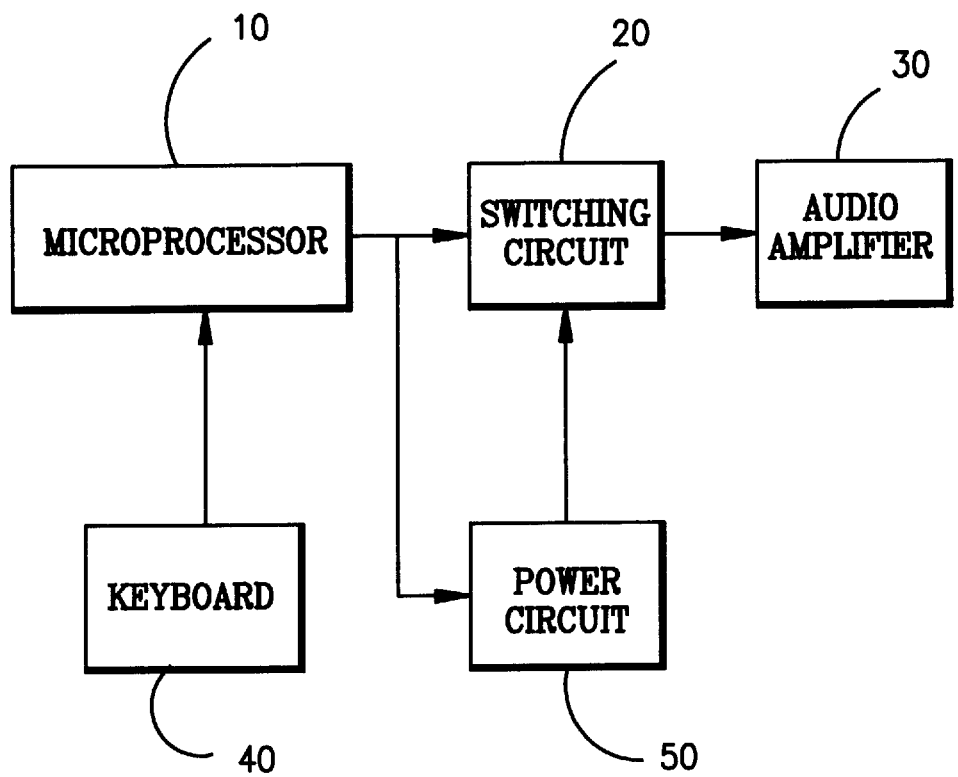
FIG. 1 is a functional block diagram of the present invention.

Referring to FIG. 1, the present invention includes a microprocessor 10, a switching circuit 20, an audio amplifier 30, a keyboard 40, and power circuit 50. The audio amplifier 30, which may be built-in to or integral with the monitor, normally operates to output audio signals retrieved from an audio source such as a CD-ROM player to a speaker (not shown) when the CPU is in a normal working state, and is normally shut down when the CPU switches to an energy saving state because the CPU has been inactive for a predetermined period of time.

Figure 2A:
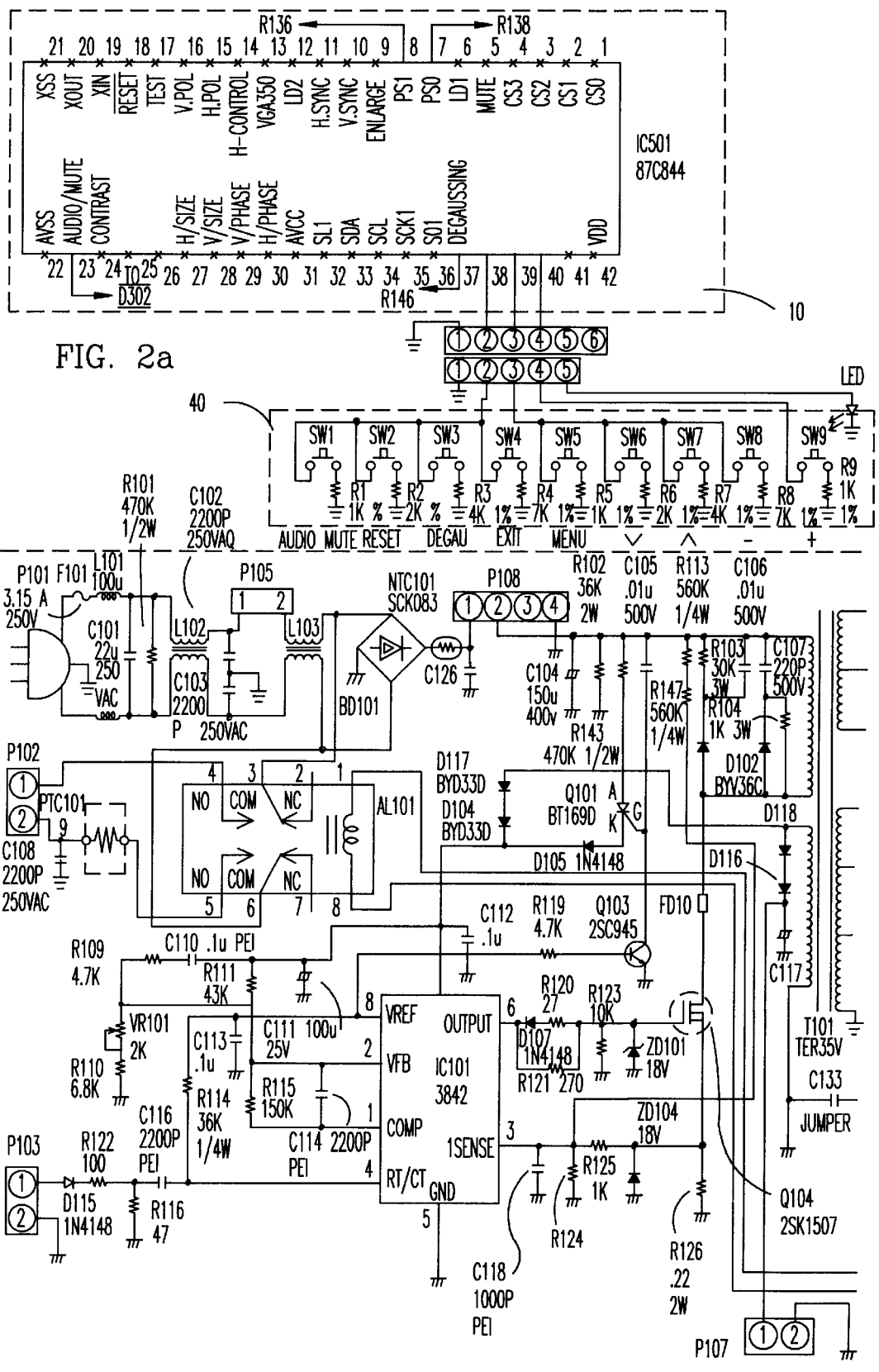
FIG. 2 is a schematic circuit diagram showing details of a preferred embodiment of the invention generally illustrated in FIG. 1.
Figure 2B:
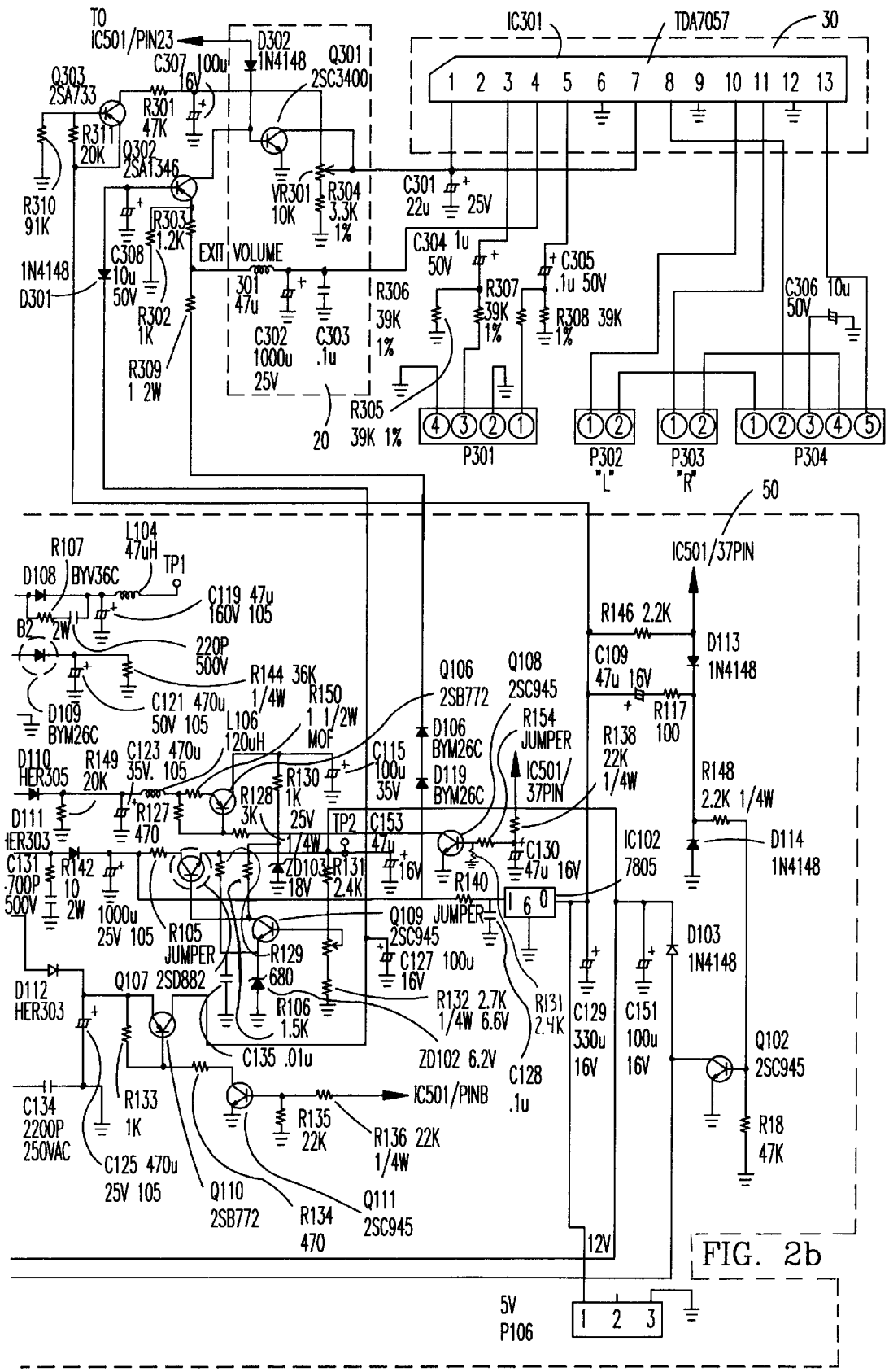

As illustrated in FIG. 2, the audio amplifier IC301, which is a commercially available integrated circuit, includes a terminal 7 connected to a volume control made up of resistors VR301 and R304 which controls the voltage input from the power circuit 50 via transistor Q303. A transistor Q302 activated by a control signal supplied by the power circuit serves to shut-off power input to terminal 7 of the audio amplifier when the power circuit is deactivated to save energy upon receiving an "inactive" signal from the microprocessor 10.

In order to prevent shut down of the audio amplifier when transistor Q302 is switched, an output terminal of the microprocessor which is activated by a switch SW1 on keyboard 40 is connected through a switch to the audio amplifier in such a manner that when the CPU switches the monitor to the energy saving state, the normal function of the audio amplifier is maintained, allowing the audio amplifier can be independently used and sound can be heard, for example from a CD-ROM player, even when the CPU is not being used. This is accomplished, as described in more detail below, by connecting an output terminal of the microprocessor directly to a switch Q301 in the form of a transistor having a control electrode connected to both transistor Q302 and the output terminal of the microprocessor, and a collector electrode (or emitter electrode depending on the transistor configuration) connected to the audio amplifier input terminal 7 such that when switch 0302 is turned on, the audio amplifier is cut off and when switch Q302 is turned off, the audio amplifier is permitted to operate normally.

It will of course be appreciated by those skilled in the art that the terms "high" and "low" as used herein are relative terms, and that the exact voltages and circuit elements will depend on the nature of the microprocessor, audio amplifier, and transistor switches, and further that in some systems the output in question might need to be set at a high rather than low voltage in order to maintain operation of the audio amplifier, with the details of the circuit to be described below varying accordingly.

In operation, the switch Q301 shown in FIG. 2 (and also in FIG. 3) maintains the audio amplifier in an operating state based on the state of audio terminal 23 of microprocessor IC501, terminal 23 being connected, through a series-connected diode D302 having a cathode on the microprocessor side of the diode, to the base or control electrode of transistor Q301. The base of transistor Q301 is also connected to power circuit 50, which is conventional in nature and which includes the energy-saving feature whereby the power supply is essentially shut-down upon receiving a signal from the microprocessor and whereby during shut down, a signal supplied from the power circuit to the control electrode of transistor Q301 switches from low to high, turning on transistor Q301 and effectively shorting out the terminal 7 of the audio amplifier IC301, which controls its output state. Because of the connection between the control electrode of transistor Q301 and the microprocessor, however, if the output terminal of the microprocessor is in a low state, the control electrode of the transistor Q301 will be held in a low state, preventing the amplifier from being turned off.

Those skilled in the art will appreciate that the preferred embodiment makes use of the microprocessor's "audio mute" terminal, which is normally activated to silence the audio amplifier during normal operation. The difference with the conventional circuit is that, in the preferred embodiment, when the mute button SW1 on keyboard 40 is pushed, the corresponding output of the microprocessor is connected to maintain power to the audio amplifier rather than shut-off the amplifier.

Figure 3A:
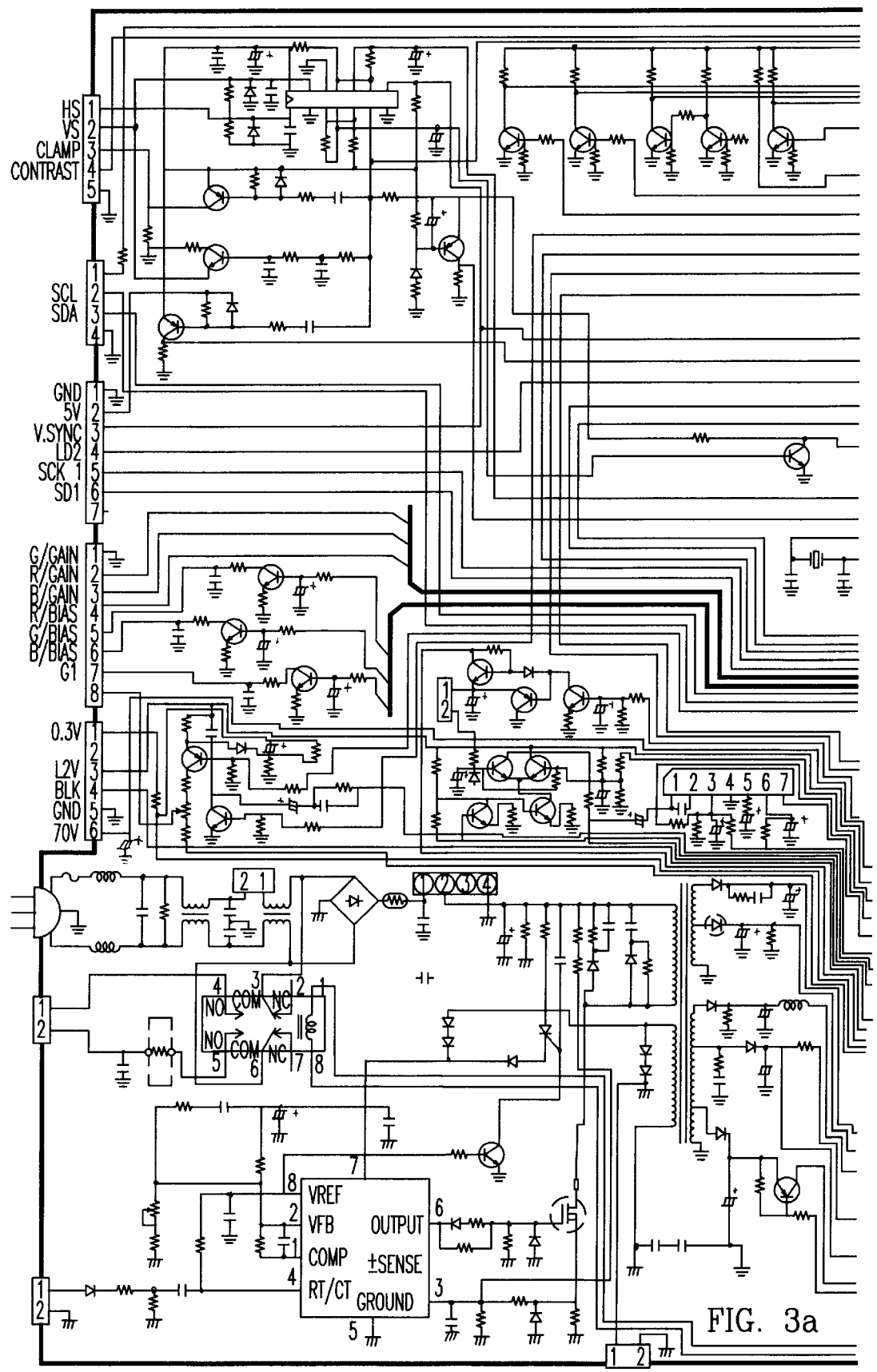
FIG. 3 is a schematic circuit diagram showing an application of the preferred embodiment to a particular monitor circuit.
Figure 3B:
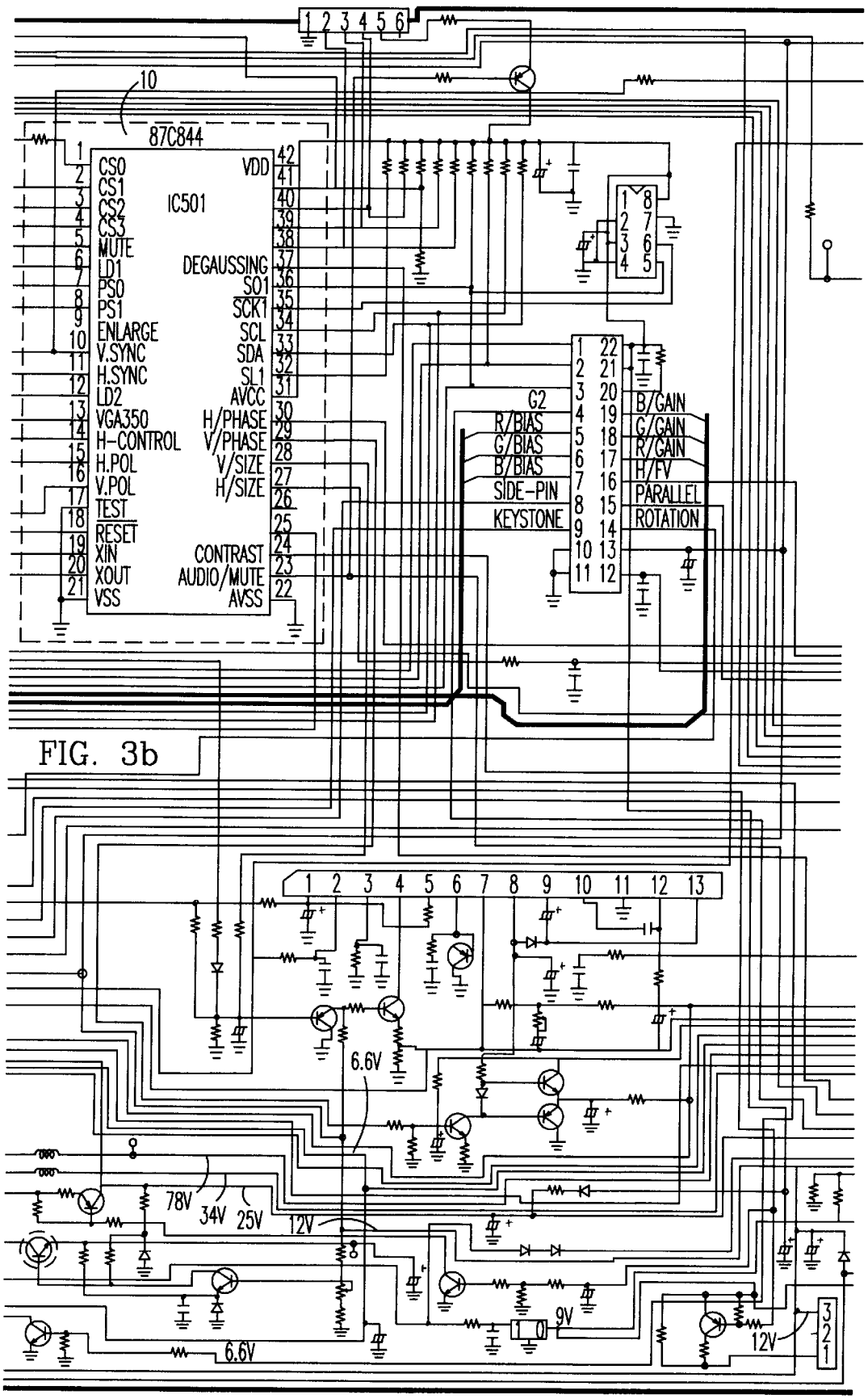
Figure 3C:
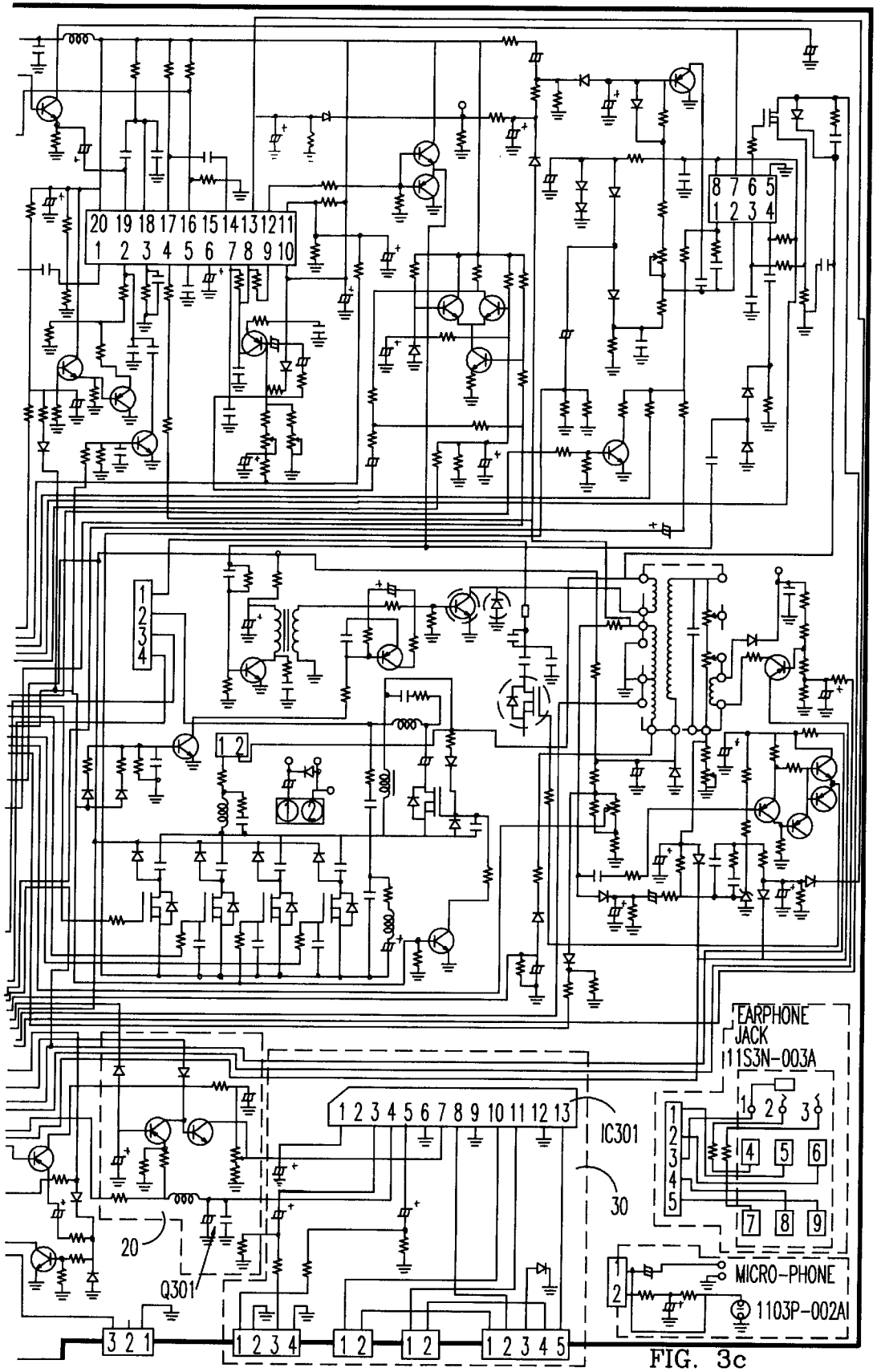

Referring to FIG. 3, which shows the same circuits as in FIG. 2, but with the addition of video processing circuitry for use in a monitor, it can be seen that when the present invention is used in a monitor, the switching circuit cooperates with both the conventional image and audio reproduction circuits shown therein so that when the monitor is being used normally, IC 301 can maintain its function as an audio amplifier. In an energy saving state, when switch SW1 is activated by a user of the system, IC501 takes over control of the audio amplifier IC301 and maintains its function so that music or other sounds can continue to be output by the audio amplifier. If switch SW1 is not activated, the audio amplifier is shut down with the video display screen.

In summary, the present invention maintains the function of an audio amplifier, by controlling a transistor connected to an audio output terminal of a microprocessor when the monitor is in an energy-saving state and the monitor display is turned off.

Having thus described various preferred embodiments of the invention, those skilled in the art will appreciate that variations and modifications of the preferred embodiment may be made without departing from the scope of the invention. It is accordingly intended that the invention not be limited by the above description or accompanying drawings, but that it be defined solely in accordance with the appended claims.

I claim:

1. An audio control circuit for a computer system having a CPU including a microprocessor, a monitor, and an audio amplifier, and means for switching to an energy-saving state by shutting down the monitor when the CPU is inactive for a predetermined period of time, wherein said computer system further includes means for maintaining a supply of power to said audio amplifier when said computer system is in said energy-saving state, wherein said means for maintaining a supply of power to said audio amplifier is a switch circuit controlled by an audio signal output terminal of the microprocessor and connected between a power circuit an audio input of the audio amplifier, and wherein said switch circuit comprises:

a transistor having a control electrode connected to the audio signal output terminal of the microprocessor such that when the control electrode of the transistor is in a first state, an input terminal of the audio amplifier is cut-off, and when the control electrode of the microprocessor is in a second state, the input terminal of the microprocessor is allowed to receive audio signals, and means connected between the control electrode of the transistor and a power circuit for switching the monitor to an energy-saving state by switching said transistor from said second state to said first state, wherein said output terminal of the microprocessor is arranged to override the energy-saving means and switch said transistor from the first state to the second state in response to activation of a switch controlling said output terminal.

2. A circuit as claimed in claim 1, further comprising a diode connected between the audio output of the microprocessor and said control electrode of the transistor, the cathode of said diode being on the side of the diode connected to the microprocessor.

\* \* \* \* \*